United States Patent
Vilatela et al.

(10) Patent No.: US 10,692,661 B2
(45) Date of Patent: Jun. 23, 2020

(54) COMPOSITE COMPRISING CNT FIBRES AND AN IONIC CONDUCTING COMPOUND AS PART OF AN ENERGY STORAGE DEVICE

(71) Applicants: B/E AEROSPACE SYSTEMS GMBH, Luebeck (DE); FUNDACIÓN IMDEA MATERIALES, Getafe (ES); FUNDACIÓN IMDEA ENERGÍA, Móstoles (ES)

(72) Inventors: Juan José Vilatela, Getafe (ES); Rebecca Marcilla, Móstoles (ES); Jesús Palma, Móstoles (ES); Evgeny Senokos, Getafe (ES); Detlev Degenhardt, Luebeck (DE); Sherif Ashraf, Luebeck (DE)

(73) Assignee: B/E Aerospace Systems GmbH, Luebeck (DE)

( * ) Notice: Subject to any disclaimer, the term of this patent is extended or adjusted under 35 U.S.C. 154(b) by 11 days.

(21) Appl. No.: 15/760,581

(22) PCT Filed: Sep. 16, 2015

(86) PCT No.: PCT/EP2015/071267
§ 371 (c)(1),
(2) Date: Mar. 15, 2018

(87) PCT Pub. No.: WO2017/045715
PCT Pub. Date: Mar. 23, 2017

(65) Prior Publication Data
US 2018/0261401 A1 Sep. 13, 2018

(51) Int. Cl.
*H01G 11/36* (2013.01)
*H01G 11/56* (2013.01)
*C01B 32/178* (2017.01)

(52) U.S. Cl.
CPC .......... *H01G 11/36* (2013.01); *C01B 32/178* (2017.08); *H01G 11/56* (2013.01); *C01B 2202/10* (2013.01); *C01B 2202/22* (2013.01); *C01B 2202/32* (2013.01); *Y02E 60/13* (2013.01)

(58) Field of Classification Search
CPC ........ H01G 11/36; H01G 11/56; H01G 11/24; H01G 11/28; H01G 11/48; H01G 11/46; C01B 32/178; C01B 2202/10; C01B 2202/22; C01B 2202/32; C01B 32/158; Y02E 60/13; B82Y 30/00
USPC .......................................................... 361/502
See application file for complete search history.

(56) References Cited

U.S. PATENT DOCUMENTS

| | | | |
|---|---|---|---|
| 2011/0255212 A1* | 10/2011 | Liu | H01G 5/011 361/502 |
| 2012/0140378 A1* | 6/2012 | Tan | H01G 11/02 361/500 |
| 2013/0271085 A1* | 10/2013 | Chen | H01M 4/0445 320/132 |

(Continued)

*Primary Examiner* — Michael P McFadden
(74) *Attorney, Agent, or Firm* — Donna P. Suchy

(57) ABSTRACT

The present invention relates to Composite comprising CNT fibres and an ionic conducting compound forming a homogeneous continuous phase or a two-phase bicontinuous structure and its process of obtainment by impregnation methods. Furthermore the invention relates to its use as part of an energy storage device such as an structural flexible electrochemical capacitor.

26 Claims, 4 Drawing Sheets a)
1 Porous activated carbon electrodes
2 Current collector
3 Separator
4 Liquid electrolyte b)
5 CNT Fiber electrodes
6 Ionic conducting compound

(56) References Cited

U.S. PATENT DOCUMENTS

2014/0284083 A1* 9/2014 Srinivas .................. G06F 3/041
                                                          174/251
2018/0298221 A1* 10/2018 Swogger .................. C09D 7/62

* cited by examiner

COMPOSITE COMPRISING CNT FIBRES AND AN IONIC CONDUCTING COMPOUND AS PART OF AN ENERGY STORAGE DEVICE

The present invention relates to a composite comprising CNT fibres and an ionic conducting compound forming a homogeneous continuous phase or a two-phase bicontinuous structure and its process of obtainment by impregnation methods. Furthermore the invention relates to its use as part of an energy storage device such as a structural flexible electrochemical capacitor.

STATE OF ART

There is an ever increasing need for more efficient energy storage devices for transport, portable electronics and other sectors. Amongst these devices, supercapacitors, and particularly those based on an electric double-layer (ED supercapacitor), have been developed for applications requiring high power densities. A typical example of such an application is an energy recovery system in an automobile, where the kinetic energy recovered from braking needs to be rapidly stored in a few seconds, i.e. too fast for batteries and similar devices based on redox reactions.

In a supercapacitor the energy is stored as a nanometric layer of ions formed on the surface of the electrodes called the active material. The high power density in such devices is due to the small diffusion lengths of the ions and their fast rate of polarization. A typical construction consists of two electrodes of porous carbonaceous material (typically activated carbon) previously deposited onto two metallic current collectors between of which a solid separator is placed. The electrodes and separator are flooded with liquid electrolyte (aqueous or organic solvent containing dissolved salts). In its final embodiment multiple devices are packed inside a metallic housing required to contain the liquid phase and to provide a structure to affix the device to its final support.

These devices have the properties of rapid charging/discharging, however, are bulky and often heavy structures that take up a large space where they are finally used.

These limitations have motivated the development of light-weight flexible supercapacitors, which by virtue of these properties and their often planar shape can be more easily integrated into the final application.

Structural carbon fibre laminate composites acting as a supercapacitor has attracted significant interest recently.

Javaid A, Ho K K C, Bismarck A, et al., 2014, Multifunctional structural supercapacitors for electrical energy storage applications, Journal of Composite Materials, Vol:48, ISSN:0021-9983, Pages:1409-1416

Shirshova N, Bismarck A, Carreyette S, et al., 2013, Structural supercapacitor electrolytes based on bicontinuous ionic liquid-epoxy resin systems, Journal of Materials Chemistry A, Vol:1, ISSN:2050-7488, Pages:15300-15309

Qian H, Kucernak A R, Greenhalgh E S, et al., 2013, Multifunctional Structural Supercapacitor Composites Based on Carbon Aerogel Modified High Performance Carbon Fiber Fabric, ACS Applied Materials & Interfaces, Vol:5, ISSN:1944-8244, Pages:6113-6122

Shirshova N, Qian H, Shaffer M S P, et al., 2013, Structural composite supercapacitors, Composites Part A—Applied Science and Manufacturing, Vol:46, ISSN:1359-835X, Pages:96-107

Qian H, Diao H, Shirshova N, et al., 2013, Activation of structural carbon fibres for potential applications in multifunctional structural supercapacitors, Journal of Colloid and Interface Science, Vol:395, ISSN:0021-9797, Pages: 241-248

Westover A. S. et al, 2014, A Multifunctional Load-Bearing Solid-State Supercapacitor, Nano Letters, 14, 3197

The principle is based on the fact that the carbon fibres are already conductive and can therefore act as electrodes, while the polymer matrix can—after appropriate modification—promote the ionic transfer required for the operation of a supercapacitor. Nevertheless the main disadvantages of these supercapacitors are the very low specific surface of the carbon fibre (0.2 $m^2/g$), which limits their capacitance and therefore device performance in terms of power and energy densities.

Although some of the references listed above try to increase the porosity and surface area of the carbon fibers, for example adding carbon nanotubes CNTs to the carbon fibers CFs obtaining values of about 30 $m^2/g$. Cited procedures are cumbersome and mechanical properties of electrodes are reduced. Furthermore, the main disadvantage relates to the poor adhesion between CF and the CNTs.

U.S. Pat. No. 8,576,542 (B2) relates to an electrochemical capacitor used as a structural element in a device into which the electrochemical capacitor is incorporated, the electrochemical capacitor comprising an carbon anode, a carbon cathode and a solid electrolyte; wherein the combined anode, cathode and solid electrolyte forms a rigid unit and the rigid unit that consists essentially of the anode, the cathode and the solid electrolyte has a compressive stiffness of at least about 10 MPa and about 1000 GPa in a tension loading mode and release energy at an energy density of at least about 1 nJ/g ($3 \times 10^{-10}$ Wh/kg). The capacitance values of the described electrochemical capacitors are about 7.5 mF/g; the balance between electrochemical and mechanical properties is still a challenge.

WO2013136034 relates to a structural material comprising structural arrangements of fibres embedded within an aerogel or xerogel, which is further infused with an ionic liquid or a multifunctional epoxy resin electrolyte. WO2013136034 provides a method to combine an aerogel or xerogel with a structural arrangement of fibers to form a mechanically, electrically and improved structural material; the structurally-improved material is formed because the aerogel or xerogel provides a nanoscale reinforcement. The aerogel or xerogel provides higher specific surface area for the double layer formation. Capacitance values up to 1.2 F/g are measured.

DESCRIPTION OF THE INVENTION

The present invention relates to a composite comprising CNT fibres and an ionic conducting compound forming a homogeneous continuous phase or a two-phase bicontinuous structure and its process of obtainment by impregnation methods. Furthermore the invention relates to its use as part of an energy storage device such as a structural electrochemical capacitor.

The term "carbon nanotube fibres" refers herein to an array of agglomerated carbon nanotubes with one of its dimensions much greater that the other two, either as a filament or as a planar film. The "carbon nanotube fibres" of the present invention are predominantly made up of nanotubes of few layers (less than 100 layers), have high aspect ratio (higher than 100), are highly graphitic and are preferentially aligned parallel to the fibre axis.

In the present invention "a material forming a homogeneous continuous phase" relates to a material or combination of materials which form a volume throughout which all physical and chemical properties are essentially uniform, this means, chemical composition and physical properties are the same in all parts of the system. It corresponds to a continuous volume, that is, a volume wherein all subvolumes are connected to at least another subvolume (i.e. topologically continuous) and complying with the definition of a phase in the thermodynamic sense.

In the present invention the ionic conducting compound is forming "a two-phase bicontinuous structure" when it is comprises two interpenetrating percolating thermodynamic phases. A material forming a two-phase bicontinuous structure is obtained when, for example, the ionic polymer is filling the pores of the non-ionic polymer.

The term "electrochemical capacitor" refers herein to a device comprising a conducting electrolyte which provides a mode of electrical charge, energy-storage and delivery of electricity.

The advantages of the present invention are the following:
High specific tensile strength and specific tensile modulus to withstand mechanical stress. Herein "specific" refers to properties normalized by specific gravity, which the expert in the field will recognize as a figure of merit of light weight and mechanical performance.
Flexibility in bending, enabling, shaping into complex shapes
Avoid the need for metallic (i.e. heavy) current collector and hermetic housing.
As laminate composite structure enables easy integration into structural parts by incorporation as an interleaf, additional lamina or surface layer.
Comprising a solid polyelectrolyte and thus avoiding the need for a liquid electrolyte which are often volatile and toxic and imply that a heavy containment housing needs to be added to the device.
The fabrication process requires fewer steps than traditional ED supercapacitors, which can in fact be carried out continuously on-line with fibre production.

A first aspect of the present invention relates to a composite (herein "the composite of the invention") characterized in that it comprises:
carbon nanotube fibres optionally comprising a metal oxide, a transition-metal phosphate, a metal nitride, a conducting polymer or a combination thereof,
an ionic conducting compound selected from a list consisting of an ionic polymer, an ionic liquid, a non-ionic polymer or a combination thereof,
wherein the ionic conducting compound is impregnating the CNT fibres and wherein the ionic conducting compound is forming an homogeneous continuous phase or a two-phase bicontinuous structure.

The term "carbon nanotube fibres" refers herein to an array of agglomerated carbon nanotubes with one of its dimensions much greater that the other two, either as a filament or as a planar film. The "carbon nanotube fibres" of the present invention are predominantly made up of nanotubes of few layers (less than 100 layers), have high aspect ratio (higher than 100), are highly graphitic and are preferentially aligned parallel to the fibre axis.

In a preferred embodiment, the carbon nanotube fibres are formed by less than 20 layers of carbon nanotubes and have a specific surface area larger than 100 m$^2$/g and electrical conductivity above 10$^4$ S/m and and an aspect ratio greater than 10 micron>.

The carbon nanotube fibres optionally comprise a metal oxide, a transition-metal phosphate, a nitride, a conducting polymer or a combination thereof.

The term "metal oxide" refers herein to binary (MO), ternary (MYO) or mixed metal oxides (MXYZO), where M, X, Y and Z are any metal. Preferably the metal is selected from Fe, Mn, Ru, Co, Ni, Cu, Bi, V. In a preferred embodiment, the metal oxide is selected from the list consisting of $Bi_2O_3$, $MnO_2$, $RuO_2$, $Fe_2O_3$, $Co_3O_4$, $FeCo_2O_4$ and $NiCoMnO_4$.

In another preferred embodiment, the metal oxide adopts perovskite structure and has the chemical formula $ABO_3$, where 'A' and 'B' are two metal cations of very different sizes, and O is an oxygen anion that bonds to both. The 'A' atoms are larger than the 'B' atoms. The ideal cubic-symmetry structure has the B cation in 6-fold coordination, surrounded by an octahedron of anions, and the A cation in 12-fold cuboctahedral coordination. A and B are selected from alkali, alkali earth and lanthanide metal cations.

Preferably, the metal oxide having perovskite structure is selected from $LaMnO_3$, $LaNiO_3$ and $SrRuO_3$.

The term "transition-metal phosphates" refers herein to a phosphate comprising at least one transition-metal such as Fe, Ni, Co.

In a preferred embodiment the transition-metal phosphate is selected from the list consisting of $LiFePO_4$, NiPO and $Co_3(PO_4)_2$.

The term "metal nitride" as used herein relates to nitride comprising at least one metal. Preferably the metal nitride is selected from the list consisting of VN, MoN and TiN.

In another preferred embodiment, the conducting polymer included in the carbon nanotube fibres is selected from the list consisting of polyacetylene, polypyrrole, polyaniline (PANI), poly(thiophene)s (PT), poly(3,4-ethylenedioxythiophene) (PEDOT), poly(pyrrole)s (PPY), polycarbazoles, polyindoles, polyazepines and a combination thereof.

In the present invention the material of the invention comprises an ionic conducting compound which is forming a homogeneous continuous phase or a two-phase bicontinuous structure.

In the present invention "a material forming a homogeneous continuous phase" relates to a material or combination of materials which form a volume throughout which all physical and chemical properties are essentially uniform, this means, chemical composition and physical properties are the same in all parts of the system. It corresponds to a continuous volume, that is, a volume wherein all subvolumes are connected to at least another subvolume (i.e. topologically continuous) and complying with the definition of a phase in the thermodynamic sense.

In the present invention the ionic conducting compound is forming "a two-phase bicontinuous structure" when it is comprises two interpenetrating percolating thermodynamic phases. A material forming a two-phase bicontinuous structure is obtained when, for example, the ionic polymer is filling the pores of the non-ionic polymer.

A further embodiment of the present invention provides a composite as described before, wherein the ionic conducting compound is a combination of
a non-ionic polymer, said non-ionic polymer being a thermoplastic, thermoset or elastomer;
and an ionic polymer selected from a polycation or a polyanion with their corresponding counterions.
said ionic conducting compound forming a two-phase bicontinuous structure.

Examples of non-ionic thermoplastic are:
Hydrocarbon polymers: Polyethylene (PE), Polypropylene (PP), Polybutadiene, Polystyrene (PS)
Nonhydrocarbon carbon-chain polymers, Polyvinyl chloride (PVC), Polyvinyl fluoride (PVF), poly(vinylene fluoride) (PVDF), poly(vinylidene fluoride-hexaflvuoropropylene) (PVdF-HFP), Polytetrafuoroethylene (PTFE), Polyacrylonitrile (PAN), Polyvinyl alcohol (PVA), Polymethyl methacrylate (PMMA), Acrylonitrile-butadiene-styrene (ABS)

Heterochain thermoplastics: Polyethylene oxide (PEO), Polyoxymethylene (acetal) POM, Polyamide (PA), Polyethylene terephthalate (PET), Polybutylene terephthalate (PBT), Polycarbonate (PC)

And High temperature thermoplastics: Polyether ether ketone (PEEK), Polyphenylene sulphide (PPS), Polyamide-imide (PAI), Polyether suphone (PES), Polyether-imide (PEI), Polysulphone (PSU), Polyimide (thermoplastic) (PI).

Examples of non-ionic thermosets are:

Phenolics, Epoxies, Aminos (Urea-formaldehyde (UF), Melamine-formaldehyde (melamine) (MF)), Polyurethane (PUR), Polyesters, Vinyl esters, Polyimides, Silicones, Nitriles, Furanes and Urethanes.

Examples of non-ionic elastomers are:

natural rubber, polyisoprene, polychloroprene, polybutadiene, Styrene-butadiene rubber (SBR), Acrylonitrile-butadiene rubber, butyl rubber, ethylene-propylene, polychloroprene ('Neoprene'), polyester, Polysulphide polymer, polyurethane, silicone, fluororubbers, etc.

The term "ionic polymers" refers herein to polymers, either organic or inorganic, which contain both covalent and ionic bonds in their molecular structure. They could be classified as polycations, if the polymeric backbone in positively charged, and polyanions if the polymeric backbone is negatively charged.

Examples of ionic polymers as polycation backbone are:
poly(diallyldimethylammonium), poly(imidazolium), poly(sulphonium), poly(phosphonium) poly(quaternary amonium) and poly(piridinium) combined with anions such as halides, PF6-, BF4-, bis ((trifluoromethyl)sulfonyl)-imide [(CF3SO2)2N]—, bis(fluorosulfonyl)imide N(SO2F)2- and cyano-functionalized anions.

The term "halide ions" refers herein to an halogen atom bearing a negative charge, for example fluoride (F—), chloride (Cl—), bromide (Br—), iodide (I—) and astatide (At—).

Examples of ionic polymers as polyanion backbone are polysaccharides, polysulphates, polyphosphates and polycarboxylates combined with inorganic cations such as alkali metal cations, alkali earth rare cations or with organic cations such as imidazolium, piridinium, pyrrolidinium, ammonium, sulphonium, and phosphonium.

A further embodiment of the present invention provides a composite as described before, wherein the ionic conducting compound is a combination of
an ionic polymer, said ionic polymer selected from a polycation or a polyanion with their corresponding counterions.
and an ionic liquid,
said ionic conducting compound forming a two-phase bicontinuous structure.

Ionic polymers are the same as those mentioned before.

The term ionic liquid refers to a salt liquid at temperatures below 100° C. which is composed by an organic or inorganic cation and an organic or inorganic anion. Examples of ionic liquids consist of bulky and asymmetric organic cations such as 1-alkyl-3-methylimidazolium, 1-alkylpyridinium, N-methyl-N-alkylpyrrolidinium, ammonium, phosphonium and sulphonium and a wide range of anions such as inorganic; halides, tetrafluoroborate and hexafluorophosphate, and organic: bistriflimide, cyanamide, triflate and tosylate.

In a preferred embodiment, the ionic liquid is selected from the list consisting of N-methyl-N-alkylpyrrolidinium bis ((trifluoromethyl)sulfonyl)-imide, N-methyl-N-alkylpyrrolidinium bis(fluorosulfonyl)imide, 1-alkyl-3-methylimidazolium bis ((trifluoromethyl)sulfonyl)-imide and 1-alkyl-3-methylimidazolium bis(fluorosulfonyl)imide.

A further embodiment of the present invention provides a composite as described before, wherein the ionic conducting compound is a combination of
a non-ionic polymer said non-ionic polymer being thermoplastic, thermoset or elastomer,
and an ionic liquid,
said ionic conducting compound forming a two-phase bicontinuous structure.

Non-ionic polymers are the same as those mentioned before.

Ionic liquids are the same as those mentioned before. Preferably, the ionic liquid is selected from the list consisting of N-methyl-N-alkylpyrrolidinium bis ((trifluoromethyl)sulfonyl)-imide, N-methyl-N-alkylpyrrolidinium bis(fluorosulfonyl)imide, 1-alkyl-3-methylimidazolium bis ((trifluoromethyl)sulfonyl)-imide and 1-alkyl-3-methylimidazolium bis(fluorosulfonyl)imide.

A preferred embodiment of the present invention the ionic conducting compound of the composite of the invention is forming a homogeneous continuous phase and said ionic conducting compound comprises at least an ionic polymer (See examples mentioned before).

Preferably the ionic polymer is selected from the list consisting of poly(diallyldimethylammonium) bis ((trifluoromethyl)sulfonyl)-imide, poly(1,3-diallylimidazolium) bis ((trifluoromethyl)sulfonyl)-imide and poly(diallyldimethylammonium) bis(fluorosulfonyl)imide.

More preferably, the ionic conducting compound of the composite of the invention is forming a homogenoeus continuous phase and comprises poly(diallyldimethylammonium) bis ((trifluoromethyl)sulfonyl)-imide and N-methyl-N-alkylpyrrolidinium bis ((trifluoromethyl)sulfonyl)-imide as ionic liquid.

A preferred embodiment of the present invention the ionic conducting compound of the composite of the invention is forming a homogeneous continuous phase and said ionic conducting compound is a combination of a non-ionic polymer and an ionic liquid.

Preferably the non-ionic polymer is selected from the list consisting of poly(vinylene fluoride) (PVDF), poly(vinylidene fluoride-hexafluoropropylene) (PVdF-HFP), Polyacrylonitrile (PAN), Polyvinyl alcohol (PVA) and Polyethylene oxide (PEO).

Preferably the ionic liquid is selected from the list consisting of N-methyl-N-alkylpyrrolidinium bis ((trifluoromethyl)sulfonyl)-imide, N-methyl-N-alkylpyrrolidinium bis (fluorosulfonyl)imide, 1-alkyl-3-methylimidazolium bis ((trifluoromethyl)sulfonyl)-imide and 1-alkyl-3-methylimidazolium bis(fluorosulfonyl)imide.

More preferably, the ionic conducting compound of the composite of the invention is forming a homogeneous continuous phase and said ionic conducting compound is a combination of poly(vinylidene fluoride-hexafluoropropylene) (PVdF-HFP) and N-methyl-N-alkylpyrrolidinium bis ((trifluoromethyl)sulfonyl)-imide.

Preferably the composite of the invention is laminated.

A second aspect of the present invention relates to a process of obtainment of the composite of the invention, wherein the process is characterized in that it is performed by solution or non-solution impregnation methods.

It is noticeable is that the formation of a two-phase bicontinuous structure may occur spontaneously.

Preferably the solution impregnation methods are selected from the list consisting of deep coating, spin coating, casting, spray coating, brushing and infusion, which are more preferably followed by a step of drying after the impregnation.

Preferably, the non-solution impregnation methods are selected from the list consisting of hot pressing and infusion.

Another aspect of the invention relates to the use of the composite of the invention as part of an energy storage device, preferably a structural electrochemical capacitor.

The term "electrochemical capacitor" refers herein to a device comprising a conducting electrolyte which provides a mode of electrical charge, energy-storage and delivery of electricity.

The last aspect of the invention refers to a structural flexible electrochemical capacitor (herein the capacitor of the invention) characterized in that it comprises at least a pair of composites, according to the composite of the invention, linked by means of an electrical wire forming an electrical circuit, wherein the carbon nanotube fibres are working as electrodes and the ionic conducting compound as electrolyte.

Optionally, the pair of composites and a separator are sandwiched, wherein the separator is selected from a polymeric separator such as cellulosic, porous polypropylene and an inorganic separator such as ceramic membranes and glassy fibre membranes.

Preferably, the capacitor of the invention is characterized in that it is laminated Several of those electrochemical capacitors may be easily connected in series, parallel or mix series/parallel in order to obtain a stack comprised of single cells providing the appropriate voltage and current required for each envisaged application. The electrochemical capacitors of the present invention are tough units, and as such are capable of functioning structural elements in a variety of constructions. The electrochemical capacitors may be configured in a variety of shapes what makes them easily to be integrated with different elements. For instance, the electrochemical capacitor of the present invention may be designed to be integrated in a protective casing or housing for a piece of equipment.

Unless otherwise defined, all technical and scientific terms used herein have the same meaning as commonly understood by one of ordinary skill in the art to which this invention belongs. Methods and materials similar or equivalent to those described herein can be used in the practice of the present invention. Throughout the description and claims the word "comprise" and its variations are not intended to exclude other technical features, additives, components, or steps. Additional objects, advantages and features of the invention will become apparent to those skilled in the art upon examination of the description or may be learned by practice of the invention. The following examples and drawings are provided by way of illustration and are not intended to be limiting of the present invention.

EXAMPLES

Figure 1:
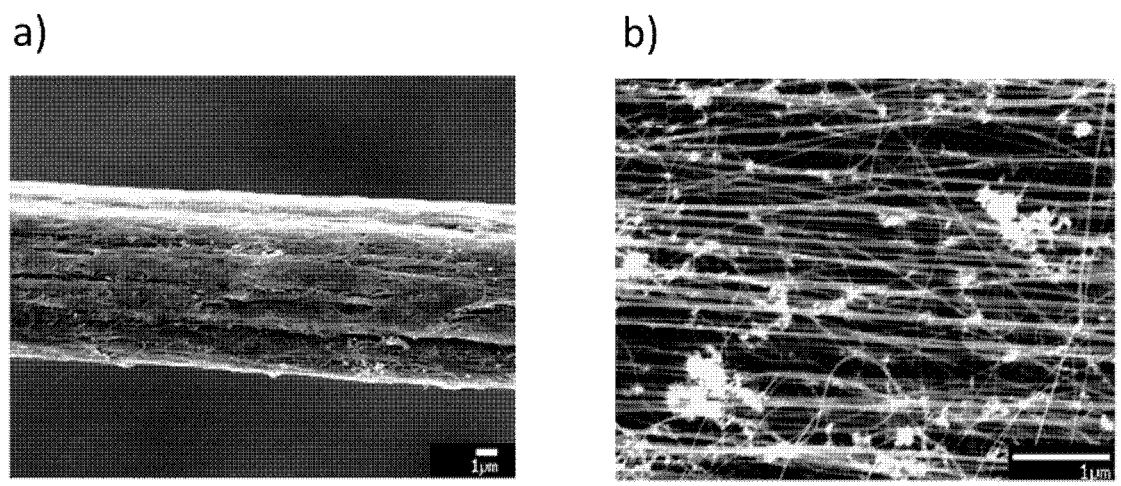
FIG. 1 Scanning electron micrographs of a CNT fibre filament (b) and its porous structure (a)

Example 1: Characterization of the CNT Fibers and the Laminate Composite of the Invention FIG. 1 presents an example of the fibre, which is a continuous macrosocopic filament. Because it is comprised of CNTs it has a high porosity (a) and a surface are of around 200 $m^2/g$, that is, about 1000 times higher than CF. This material is also strong and has proven to be easily integrated in composites to produce very strong and light structures.

Figure 2:
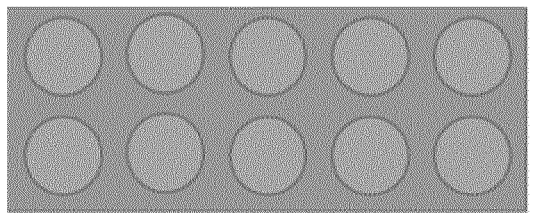
FIG. 2. Comparison figure of the cross-sections of a CF composite and a porous CNT fibre composite.
Figure 2:
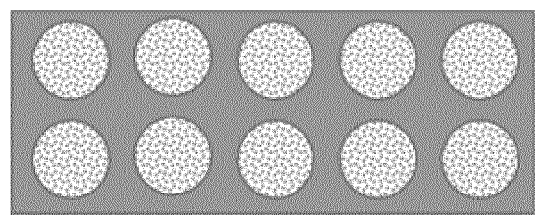

FIG. 2 presents a schematic comparison of the cross-sections of a CF composite and a porous CNT fibre composite (present invention), respectively. The much larger specific surface of the CNT fibre results in a better charge storage system. A comparison of standard electrochemical tests of these materials give a specific capacitance of about 0.5-3F/g for CF and around 40F/g for the CNT fibres.

This porosity not only increases overall charge storage performance, but also helps solve one of the main challenges in structural supercapacitors: simultaneous charge and load transfer through the polymer matrix. In a fibre composite structure the matrix that holds the fibres together is normally stiff in order to maximise transfers stress between fibres and therefore composite mechanical performance. In a supercapacitor the matrix requires a high ionic conductivity that enables charge transfer for its operation as a charge storage device. These two properties tend to be mutually exclusive, i.e., the stiffer the matrix the lower its ionic conductivity and vice versa.

Figure 3:
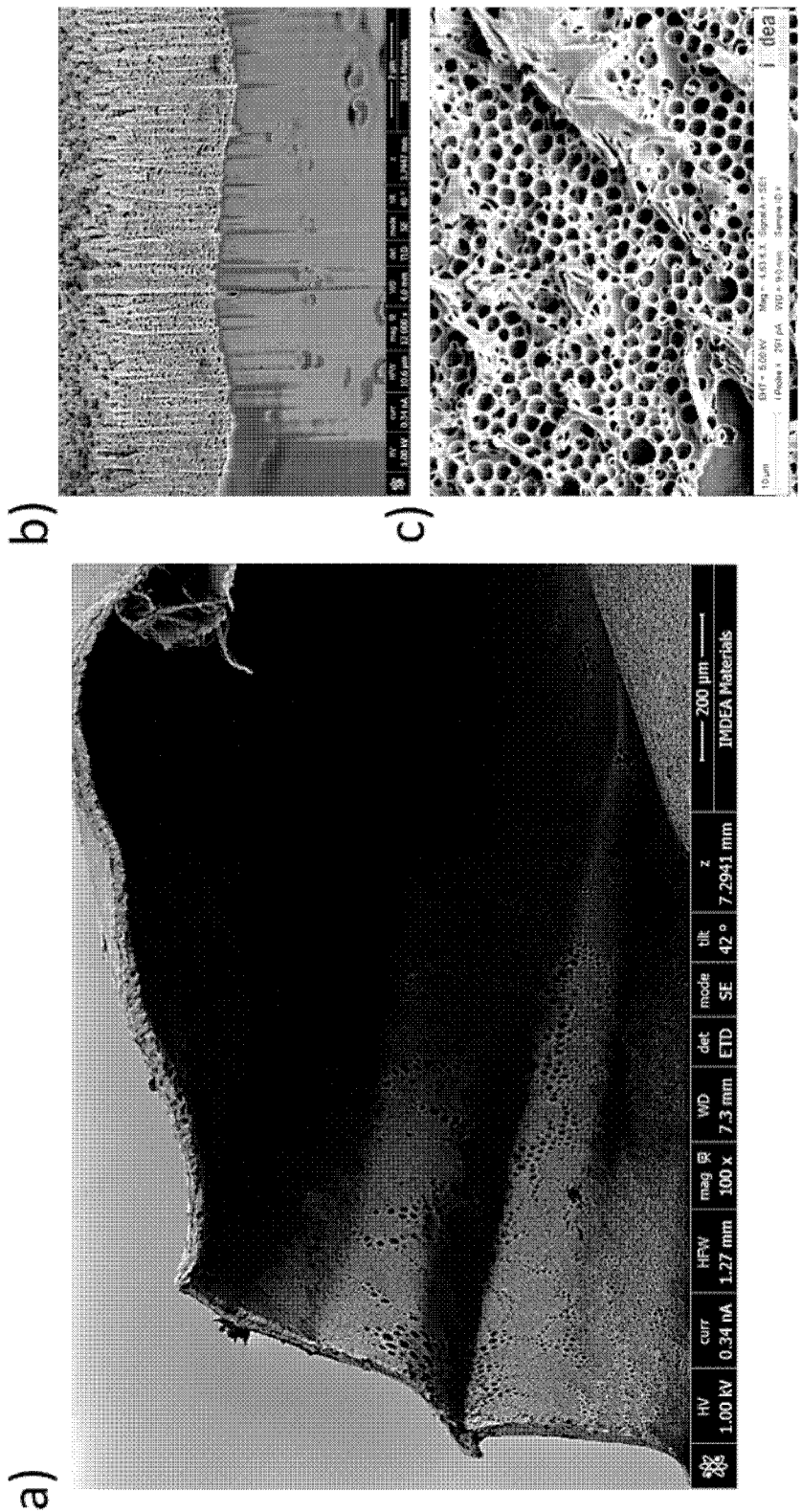
FIG. 3 Electron micrographs of an example of half of a supercapacitor device (for clarity) consisting of an electrode of CNT fibre and continuous non-ionic polymeric porous phase. A) CNT fibre array with polymer, b) interface between the CNT fibre and the polymeric phase and c) top view showing the porous continuous polymer structure.

FIG. 3 shows electron micrographs of an example of half of a supercapacitor device (for clarity) consisting of an electrode of CNT fibre and continuous non-ionic polymeric porous phase. A) CNT fibre array with polymer, b) interface between the CNT fibre and the polymeric phase and c) top view showing the porous continuous polymer structure.

Example 2: Structural Electrochemical Capacitor by Solution Impregnation Method and Ionic Polymer A structural electrochemical capacitor comprising two laminate composites composed of CNT fibers, being the active material, impregnated with one ionic conducting compound acting as electrolyte by using a solution impregnating method. The ionic conducting compound is a binary blend of an ionic polymer, in particular a polycation, and a salt that can be combined at different mass ratios. The ionic polymer is poly(diallyldimethylammonium) bis(trifluoromethanesulfonyl)imide (pDADMATFSI) and the salt is an ionic liquid named N-methyl-N-butylpyrrolidinium bis(trifluoromethanesulfonyl)imide, ($PYR_{14}TFSI$). In the present example the ratio of polymer/salt is 40/60 in weight. This ratio was selected because it provided self-standing membranes with an optimum balance between mechanical stability and ionic conductivity (from $10^{-7}$ to $10^{-1}$ S/cm in the temperature range of −30° C. to 120° C.).

In this example CNT fiber electrodes have circular shape with 1 cm diameter (area 0.7854 cm$^2$). Impregnation of CNT fibers was performed by using casting impregnation method consisting on adding a diluted acetone solution of ionic conducting compound into CNT fibers electrodes using a micropipette and subsequent drying at 60° C. under vacuum overnight.

The ionic conducting compound solution was easily absorbed by the CNT fiber electrode and hence the porous structure of CNT fiber could be filled with ionic conducting compound. Moreover, an external thin layer of ionic conducting compound layer is formed on top of the CNT fiber electrodes. In this example, this layer will serve both as solid electrolyte and as separator so there is no need to add further physical separator in between two electrodes.

Figure 4:
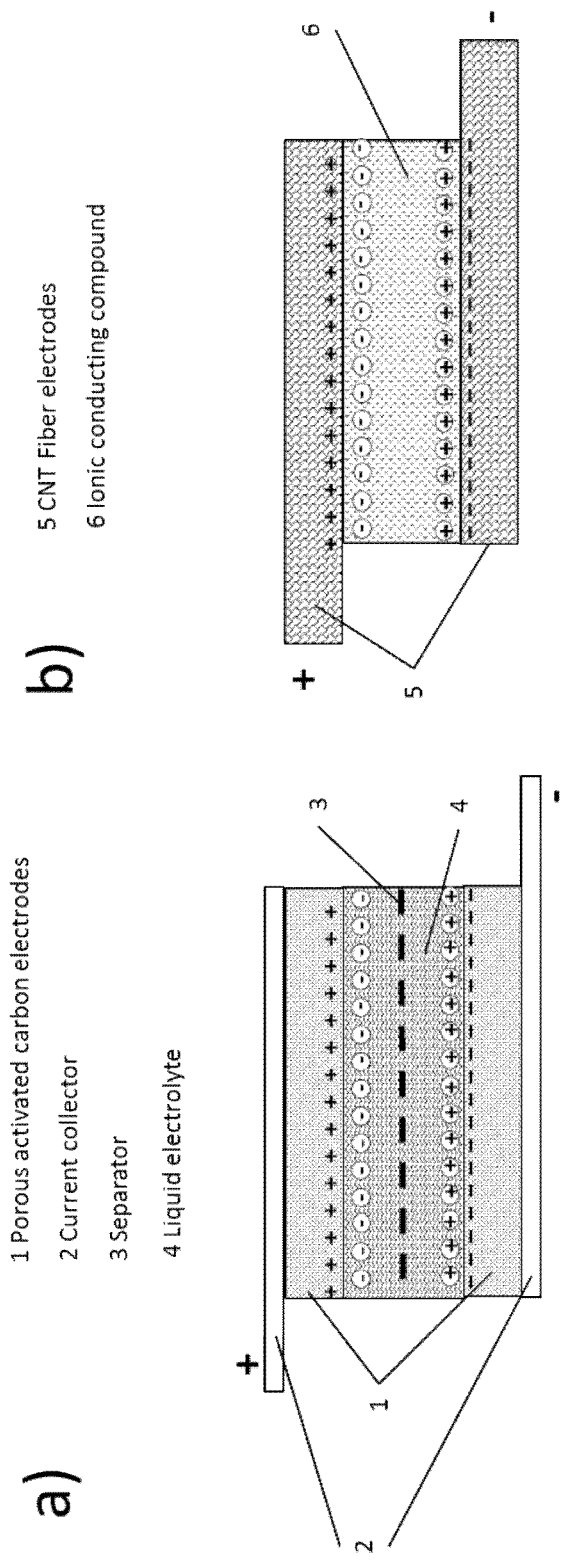
FIG. 4 a) Schematic diagram of a typical supercapacitor based on liquid electrolyte, b) Schematic diagram of the supercapacitor of the invention

After solidification by drying the solvent, structural supercapacitors were assembled by stacking two electrodes with their surfaces impregnated by ionic compound in contact, as shown in FIG. 4. In this example, structural supercapacitors were pressed by using an electric precision rolling press in order to reduce the internal resistance of the structural supercapacitor.

FIG. 4 shows a schematic view of the structural capacitor of the invention (b) in comparison with a typical supercapacitor construction (a). The structural capacitor of the present invention is comprised of two laminate composites composed of CNT fibers impregnated with one ionic conducting compound. An external thin layer of ionic conducting compound layer is formed on top of the CNT fiber electrodes and is represented as the intermediate layer in between the two faced CNT fiber electrodes in FIG. 4. The CNT fibers act both as active material and current collector whereas the ionic conducting compound is acting as electrolyte.

Electrochemical properties of the exemplary structural electrochemical capacitor were tested by galvanostatic charge-discharge (CD) using a multichannel Bio-Logic VMP3. CD experiments were conducted from 0 to 3.5 V at different current densities: 10, 5, 2 and 1 mAcm$^{-2}$ and the following parameters were obtained and included in Table 1; specific capacitance of capacitor ($C_{sc}$), specific capacitance of individual CNT fiber electrode ($C_{am}$), equivalent series resistance (ESR), real specific energy ($E_{real}$), maximum specific energy ($E_{max}$), specific average power ($P_{av}$), maximum specific power ($P_{max}$), coulombic efficiency ($\mu$).

normalized to the mass of active material, that tis, to the mass of the two bare CNT fiber electrodes. Excellent electrochemical performance of this exemplary structural electrochemical capacitor is due to both the high surface area of the CNT fibers that result in high values of capacitance ($C_{SC}$) and the wide electrochemical stability window of ionic conducting compound that allow the structural electrochemical capacitor to be charged up to a high operating voltage (V) of 3.5 V.

Example 3: Structural Electrochemical Capacitor by Non-Solution Impregnation Method and Non-Ionic Polymer A structural electrochemical capacitor comprising two laminate composites composed of CNT fibers, being the active material, impregnated with one ionic conducting compound acting as electrolyte by using a non-solution impregnation method. The ionic conducting compound is a binary blend of a non-ionic polymer and a salt that can be combined at different mass rations. The non-ionic polymer is poly(vinylidene fluoride) (average Mw ~534,000,) and the salt is an ionic liquid named N-methyl-N-butylpyrrolidinium bis(trifluoromethanesulfonyl)imide, (PYR$_{14}$TFSI). In the present example the ratio of polymer/salt is 40/60 in weight. The ratio was chosen due to possibility to obtain a self-standing membrane with an optimum balance between mechanical stability and ionic conductivity (from 10$^{-7}$ to 10$^{-1}$ S/cm in the temperature range of –30° C. to 120° C.).

In this example CNT fiber electrodes have circular shape with 1 cm diameter (area 0.7854 cm$^2$) and the structural supercapacitors were assembled by sandwiching one ionic conducting membrane (1.2 cm diameter) between two CNT fibers electrodes and applying pressure in order to improve CNT fiber impregnation with ionic conducting compound. The ionic conducting membrane was obtained by casting a solution of the ionic conducting mixture in acetone. The membrane serves both as solid electrolyte and as separator, eliminating the need to use an additional physical separator between the two electrodes.

Electrochemical characteristics of the structural supercapacitor are tested by galvanostatic charge-discharge (CD) using a multichannel Bio-Logic VMP3. CD experiments were conducted from 0 to 3.5 V at different current densities: 50, 20, 10, 5, 2 and 1 mAcm$^{-2}$ and the following parameters

TABLE 1

Electrochemical properties of structural electrochemical capacitor prepared by solution impregnation method

| Current density (mAcm$^{-2}$) | $C_{sc}$ (Fg$^{-1}$) | $C_{am}$ (Fg$^{-1}$) | ESR ($\Omega$cm$^2$) | $E_{real}$ (Whkg$^{-1}$) | $E_{max}$ (Whkg$^{-1}$) | $P_{av}$ (kWkg$^{-1}$) | $P_{max}$ (kWkg$^{-1}$) | $\mu$ |
|---|---|---|---|---|---|---|---|---|
| 1 | 12 | 50 | 81 | 17 | 21 | 3.4 | 85 | 97 |
| 2 | 11 | 45 | 81 | 14 | 19 | 7 | 85 | 96 |
| 5 | 9 | 37 | 82 | 9 | 16 | 15 | 83 | 91 |
| 10 | 7 | 30 | 90 | 3 | 13 | 19 | 76 | 85 |

Maximum specific energy ($E_{max}=0.5C_{SC}V^2$) and maximum specific power ($P_{max}=V^2/4 \cdot ESR$) are the two key parameters to define the behavior of any electrochemical energy storage device. In this example, structural capacitor shows high values of $E_{max}$ going from 13 to 21 Whke$^{-1}$ and $P_{max}$ going from 76 to 85 kWkg$^{-1}$. Both parameters are were obtained and included in Table 2; specific capacitance of capacitor ($C_{sc}$), specific capacitance of individual CNT fiber electrode ($C_{am}$), equivalent series resistance (ESR), real specific energy ($E_{real}$), maximum specific energy ($E_{max}$), specific average power ($P_{a}y$), maximum specific power ($P_{max}$), coulombic efficiency ($\mu$).

TABLE 2

Electrochemical properties of structural electrochemical capacitor prepared by non-solution impregnation method.

| Current density (mAcm$^{-2}$) | $C_{sc}$ (Fg$^{-1}$) | $C_{am}$ (Fg$^{-1}$) | ESR (Ωcm$^2$) | $E_{real}$ (Whkg$^{-1}$) | $E_{max}$ (Whkg$^{-1}$) | $P_{av}$ (kWkg$^{-1}$) | $P_{max}$ (kWkg$^{-1}$) | µ |
|---|---|---|---|---|---|---|---|---|
| 1  | 10 | 41 | 15 | 17 | 17 | 5  | 401 | 88 |
| 2  | 10 | 41 | 23 | 16 | 17 | 7  | 258 | 93 |
| 5  | 9  | 36 | 20 | 14 | 15 | 18 | 300 | 97 |
| 10 | 8  | 32 | 19 | 11 | 14 | 33 | 308 | 98 |
| 20 | 7  | 29 | 19 | 7  | 12 | 57 | 325 | 98 |
| 50 | 5  | 22 | 18 | 2  | 9  | 79 | 328 | 98 |

In this example, the structural capacitor shows high values of $E_{max}$ going from 9 to 17 Whkg$^{-1}$ and $P_{max}$ going from 300 to 400 kWkg$^{-1}$. Both parameters are normalized to the mass of active material, that is, to the mass of the two bare CNT fiber electrodes. Excellent electrochemical performance of this exemplary structural electrochemical capacitor is due to both the high surface area of the CNT fibers that result in high values of capacitance ($C_{SC}$) and the wide electrochemical stability window of ionic conducting compound that allow the structural electrochemical capacitor to be charged up to a high operating voltage (V) of 3.5 V. Moreover, the low values of ESR that resulted in very high values of $P_{max}$ are due to the minimal distance between two CNT fiber electrodes in this particular example.

The invention claimed is:

1. A composite, comprising:
   carbon nanotube fibres comprising a metal oxide, a transition-metal phosphate, a metal nitride, a conducting polymer or a combination thereof,
   an ionic conducting compound selected from a list consisting of an ionic polymer, an ionic liquid, a non-ionic polymer or a combination thereof,
   wherein the ionic compound impregnates the carbon nanotube fibres and wherein the ionic conducting compound forms a homogeneous continuous phase or a two-phase bicontinuous structure.

2. The composite of claim 1, wherein the carbon nanotube fibres are formed by less than 20 layers of carbon nanotubes and have a specific surface area larger than 100 m$^2$/g and electrical conductivity above 10$^4$ S/m and an aspect ratio greater than 10.

3. The composite of claim 1, wherein the metal oxide included in the carbon nanotube fibres is selected from the list consisting of $Bi_2O_3$, $MnO_2$, $RuO_2$, $Fe_2O_3$, $Co_3O_4$ and $NiCoMnO_4$.

4. The composite of claim 1, wherein the metal oxide included in the carbon nanotube fibres adopts perovskite structure and has the chemical formula $ABO_3$, where 'A' and 'B' are two metal cations of different sizes, and O is an oxygen anion that bonds to both.

5. The composite of claim 1, wherein the metal oxide included in the carbon nanotube fibres are selected from the list consisting of $LaMnO_3$, $LaNiO_3$ and $SrRuO_3$.

6. The composite of claim 1, wherein the transition-metal phosphate is selected from the list consisting of $LiFePO_4$, NiPO and $Co_3(PO_4)_2$.

7. The composite of claim 1, wherein the metal nitride is selected from the list consisting of VN, MoN and TiN.

8. The composite of claim 1, wherein the conducting polymer included in the carbon nanotube fibres is selected from the list consisting of polyacetylene, polypyrrole, polyaniline, poly(thiophene), poly(3,4-ethylenedioxythiophene), poly(pyrrole), polycarbazol, polyindol, polyazepine and a combination thereof.

9. The composite of claim 1, wherein the ionic conducting compound is a combination of:
   the non-ionic polymer said non-ionic polymer being a thermoplastic, thermoset or elastomer,
   and the ionic polymer selected from a polycation or a polyanion with their corresponding counterions;
   the ionic conducting compound forming the two-phase bicontinuous structure.

10. The composite of claim 9, wherein the thermoplastic is selected from the list consisting of poly(vinylene fluoride), poly(vinylidene fluoride-hexafluoropropylene), Polyacrylonitrile, Polyvinyl alcohol and Polyethylene oxide.

11. The composite of claim 9, wherein the thermoset is selected from the list consisting of Phenolics, Epoxies, Aminos Urea-formaldehyde, Polyurethane, Polyesters, Vinyl esters, Polyimides, Silicones, Nitriles.

12. The composite of claim 9, wherein the elastomer is selected from the list consisting of natural rubber, polyisoprene, polychloroprene, polybutadiene, Styrene-butadiene rubber, Acrylonitrile-butadiene rubber, polychloroprene 'Neoprene', polyester, Polysulphide, polyurethane, silicone.

13. The composite of claim 9, wherein the polycation is selected from the list consisting of poly(diallyldimethylammonium), poly(imidazolium), poly(sulphonium), poly(phosphonium) poly(quaternary amonium) and poly(piridinium).

14. The composite of claim 9, wherein the polyanion is selected from the list consisting of polysaccharides, polysulphates, polyphosphates and polycarboxylates.

15. The composite of claim 1, wherein the ionic conducting compound is a combination of
   an ionic polymer said ionic polymer selected from a polycation or a polyanion with their corresponding counterions,
   and an ionic liquid,
   the ionic conducting compound forming the two-phase bicontinuous structure.

16. The composite of claim 15, wherein the ionic liquid is selected from the list consisting of N-methyl-N-alkylpyrrolidinium bis ((trifluoromethyl)sulfonyl)-imide, N-methyl-N-alkylpyrrolidinium 15 bis(fluorosulfonyl)imide, 1-alkyl-3-methylimidazolium bis ((trifluoromethyl)sulfonyl)-imide and 1-alkyl-3-methylimidazolium bis(fluorosulfonyl)imide.

17. The composite of claim 1, wherein the ionic conducting compound is a combination of
   the non-ionic polymer said non-ionic polymer being thermoplastic, thermoset or elastomer,
   and the ionic liquid,
   the ionic conducting compound forming the two-phase bicontinuous structure.

18. The composite of claim 1, wherein the ionic conducting compound of the composite forms a homogeneous continuous phase and said ionic conducting compound comprises at least the ionic polymer.

19. The composite of claim 1, wherein the ionic conducting compound is forming a homogeneous continuous phase and said ionic conducting compound is a combination of the non-ionic polymer and the ionic liquid.

20. The composite of claim 1, wherein the composite is laminated.

21. A process of obtaining the composite of claim 1, comprising at least one of:
    performing a solution impregnation method selected from the list consisting of deep coating, spin coating, casting, spray coating, brushing and infusion; or
    performing a non-solution impregnation method selected from the list consisting of hot pressing and infusion.

22. The process of claim 21, comprising a step of drying after the solution impregnation method.

23. An energy storage device comprising the composite of claim 1.

24. A structural electrochemical capacitor, comprising:
    at least a pair of the composites of claim 1, the pair of composites linked by an electrical wire forming an electrical circuit, wherein the carbon nanotube fibres are working as electrodes and the ionic conducting compound as electrolyte.

25. The structural electrochemical capacitor of claim 24, wherein the pair of composites and a separator are sandwiched, wherein the separator is selected from a polymeric separator such as cellulosic, porous polypropylene and an inorganic separator such as ceramic membranes and glassy fibre membranes.

26. The structural electrochemical capacitor of claim 24, wherein the structural electrochemical capacitor is laminated.

* * * * *